United States Patent [19]
Matsufuji et al.

[11] Patent Number: 4,784,914
[45] Date of Patent: Nov. 15, 1988

[54] MAGNETIC RECORDING MEDIUM

[75] Inventors: Akihiro Matsufuji; Akira Kasuga; Shigeo Komine; Yasuyuki Yamada; Hajime Miyatsuka, all of Odawara, Japan

[73] Assignee: Fuji Photo Film Co., Ltd., Kanagawa, Japan

[21] Appl. No.: 944,114

[22] Filed: Dec. 22, 1986

[30] Foreign Application Priority Data

Dec. 20, 1985 [JP] Japan ................................. 60-288935

[51] Int. Cl.$^4$ ............................................. G11B 5/702
[52] U.S. Cl. .................................. 428/418; 252/62.54; 427/128; 427/131; 428/328; 428/329; 428/425.9; 428/522; 428/694; 428/695; 428/900
[58] Field of Search ............ 428/694, 695, 900, 425.9, 428/522, 328, 329, 418; 427/128, 131; 252/62.54; 360/134–136

[56] References Cited

U.S. PATENT DOCUMENTS

| | | | |
|---|---|---|---|
| 4,407,901 | 10/1983 | Miyatsuka | 428/694 |
| 4,420,531 | 12/1983 | Tokuda | 428/329 |
| 4,431,712 | 2/1984 | Matsufuji | 428/900 |
| 4,521,486 | 6/1985 | Ninomiya | 428/900 |
| 4,594,174 | 6/1986 | Nakayama | 428/425.9 |
| 4,600,521 | 7/1986 | Nakamura | 428/694 |
| 4,615,949 | 10/1986 | Yoda | 428/328 |
| 4,659,626 | 4/1987 | Fukushima | 428/521 |
| 4,707,411 | 11/1987 | Nakayama | 428/900 |
| 4,716,077 | 12/1987 | Okita | 428/900 |

Primary Examiner—Ellis P. Robinson
Attorney, Agent, or Firm—Sughrue, Mion, Zinn, Macpeak & Seas

[57] ABSTRACT

A magnetic recording medium comprising a nonmagnetic support and a magnetic recording layer provided on the support, said magnetic recording layer comprising a binder and a ferromagnetic powder dispersed therein, which is characterized in that said binder is composed of a resin component comprising:

a vinyl chloride copolymer containing a repeating unit having at least one polar group selected from the group consisting of —SO$_3$M, —OSO$_3$M, —COOM and —PO(OM')$_2$, wherein M is hydrogen or an alkali metal atom, and M' is any one of hydrogen, an alkali metal atom and a lower hydrocarbon group, and a repeating unit having an epoxy group; and a polyurethane resin containing a repeating unit having at least one polar group selected from the group consisting of —SO$_3$M, —OSO$_3$M, —COOM and —PO(OM')$_2$, wherein M and M' have the same meanings as defined above.

8 Claims, No Drawings

4,784,914

MAGNETIC RECORDING MEDIUM

BACKGROUND OF THE INVENTION

1. Field of the Invention

The present invention relates to a novel magnetic recording medium.

2. Description of Prior Arts

A magnetic recording medium basically comprises a nonmagnetic support and a magnetic recording layer provided on the support, and the magnetic recording layer comprises a binder and a ferromagnetic powder dispersed therein.

Recently, a demand for a higher density recording system has increased, and hence a ferromagnetic metal powder has been employed in place of a conventional metal oxide-type ferromagnetic powder such as $\gamma$-$Fe_2O_3$ and iron oxide-type ferromagnetic powder containing other component such as cobalt.

The ferromagnetic metal powder is known to afford recording of a higher density, as the powder size is more minimized.

As a resin component for the binder dispersing the ferromagnetic metal powder therein to form a magnetic recording layer, there has been widely employed a combination of a vinyl chloride copolymer (e.g., a vinyl chloride/vinyl acetate/maleic anhydride copolymer) and a polyurethane resin. The employment of such a combination affords to produce a magnetic recording layer highly improved in various properties (e.g., strength) required for a magnetic recording medium.

However, the present inventors have found that when a magnetic recording medium using a vinyl chloride copolymer as a binder is allowed to stand under severe conditions, for example, the medium is stored at a high temperature (e.g., higher than 80° C.) and a high humidity for a long period of time, the chlorine bonding to the vinyl chloride copolymer is sometimes released as a gaseous hydrogen chloride. The released hydrogen chloride gas is liable to corrode the ferromagnetic metal powder, and further corrode metallic members such as a supporting rod or a permalloy head arranged in a recording and reproducing device such as a video tape deck.

The present inventors have applied for a patent with respect to a magnetic recording medium having a magnetic recording layer employing as a binder a combination of a vinyl chloride copolymer which is stabilized by incorporating a specific polar group and an epoxy group thereinto and a polyurethane resin (Japanese Patent Application No. 60 (1985)-92189). The magnetic recording medium disclosed in this application has many advantages such that metallic members of a recording and reproducing device such as a video tape deck which are in close contact with the recording medium are hardly corroded, even when the recording medium is allowed to stand in contact with the device at a high temperature and a high humidity for a long period of time, because the vinyl chloride copolymer contained in the medium is stable. In addition, even when the recording medium contains a ferromagnetic metal powder, the ferromagnetic metal powder is hardly corroded.

However, as a result of further studies of the present inventors on the magnetic recording medium using the aforementioned binder, it has been confirmed that a ferromagnetic powder is poorly dispersed in the specific case such as a case of using a highly minimized ferromagnetic powder. That is, in spite of using such minimized ferromagnetic powder, the resulting magnetic recording medium is not improved sufficiently in electromagnetic conversion characteristics, and some particles of the poorly dispersed ferromagnetic powder are easily dropped off from the recording medium in its running procedure. A portion of the particles dropping from the medium in the running procedure is apt to instantaneously adhere to a magnetic head, and in that instant, lowering of reproduction output (so-called instantaneous clogging on the head) is brought about.

For enhancing the dispersibility of a ferromagnetic powder, it is known to incorporate a polar group into the binder so as to improve an affinity of the binder for the ferromagnetic powder.

For instance, an invention relating to a magnetic recording medium using a polyurethane resin having a specific polar group as a binder is disclosed in Japanese Patent Publications No. 54(1979)-157603 and No. 58(1983)-41565, and Japanese Patent Provisional Publications No. 57(1982)-92422 and No. 57(1982)-92423.

Further, Japanese Patent Provisional Publications No. 57(1982)-44227, No. 58(1983)-108032, No. 60(1985)-101161, etc., disclose inventions relating to a magnetic recording medium using a vinyl chloride copolymer having a specific polar group as a binder.

Furthermore, an invention relating to a magnetic recording medium using a binder having a polar group is also disclosed in Japanese Patent Provisional Publications No. 58(1983)-105429, No. 59(1984)-8127 and No. 58(1984)-5424.

Although the employment of such binder improves the dispersibility of a ferromagnetic powder and improves some properties such as electromagnetic conversion characteristics and running endurance to certain levels, any favorable effect cannot be given by incorporating the polar group into the binder in preventing the aforementioned release of gaseous hydrogen chloride from the vinyl chloride copolymer.

SUMMARY OF THE INVENTION

It is an object of the present invention to provide a magnetic recording medium in which gaseous hydrogen chloride is less released from a magnetic recording layer using a binder containing a vinyl chloride copolymer.

It is another object of the invention to provide a magnetic recording medium in which hydrochloric acid gas (i.e., gaseous hydrogen chloride) is less released from a magnetic recording layer using a binder containing a vinyl chloride copolymer and a ferromagnetic powder is well dispersed in the magnetic recording layer.

There is provided by the present invention a magnetic recording medium comprising a nonmagnetic support and a magnetic recording layer provided on the support, said magnetic recording layer comprising a binder and a ferromagnetic powder dispersed therein, which is characterized in that said binder is composed of a resin component comprising:

a vinyl chloride copolymer containing a repeating unit having at least one polar group selected from the group consisting of —$SO_3M$, —$OSO_3M$, —COOM and —$PO(OM')_2$, wherein M is hydrogen or an alkali metal atom, and M' is hydrogen, an alkali metal atom or a lower hydrocarbon group, and a repeating unit having an epoxy group; and a polyurethane resin containing a repeating unit having at least one polar group selected from the group consisting of —SO₃M, —OSO₃M, —COOM and —PO(OM')₂, wherein M and M' have the same meanings as defined above.

In the magnetic recording medium of the present invention, an epoxy group is incorporated into the vinyl chloride copolymer to prevent occurrence of gaseous hydrogen chloride which is produced by decomposition of the vinyl chloride copolymer even under the above-described severe conditions. Accordingly, corrosion of metallic members in a recording and reproducing device or a ferromagnetic powder can be prominently reduced. In the present invention, since both of the vinyl chloride copolymer and the polyurethane resin contain the specific polar group, the ferromagnetic powder is well dispersed, and such dispersibility of the ferromagnetic powder is by no means deteriorated by incorporating the epoxy group into the vinyl chloride copolymer. Accordingly, the electromagnetic conversion characteristics are not decreased. In addition to those advantages, clogging on a magnetic head caused by a ferromagnetic powder dropping from the magnetic recording layer rarely takes place, because the recording layer contains few agglomerates of the ferromagnetic powder.

DETAILED DESCRIPTION OF THE INVENTION

A magnetic recording medium of the invention basically comprises a nonmagnetic support and a magnetic recording layer provided on the support. The magnetic recording layer comprises a binder and a ferromagnetic metal powder dispersed therein.

As a material of the nonmagnetic support, there can be mentioned those conventionally employed. Examples of the nonmagnetic support material include synthetic resin films such as films of polyethylene terephthalate, polypropylene, polycarbonate, polyethylene naphthalate, polyamide, polyamideimide, and polyimide; and metallic foils such as aluminum foil and stainless steel foil. The thickness of the nonmagnetic support is generally in the range of from 3 to 50 μm, preferably in the range of from 5 to 30 μm.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a ferromagnetic powder dispersed in a binder.

As a ferromagnetic powder employable in the invention, there can be mentioned those generally employed. Examples of the ferromagnetic powder include a ferromagnetic powder mainly containing iron, a metal oxide-type ferromagnetic powder such as a powder of $\gamma$-Fe₂O₃ or Fe₃O₄, and a modified metal oxide-type ferromagnetic powder such as a powder of Co-modified iron oxide, modified barium ferrite or modified strontium ferrite.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. Processes for the preparation of those ferromagnetic metal powders are already known, and the ferromagnetic metal powder employed in the invention can be prepared by the known processes.

Processes for the preparation of the metal oxide-type ferromagnetic powder or the modified metal oxide-type ferromagnetic powder are also known, and those processes can be applied to the preparation of a ferromagnetic powder employed in the invention.

There is no specific limitation on the shape of the ferromagnetic powder employable in the invention, but generally used is a ferromagnetic powder in needle shape, grain shape, dice shape, rice shape or plate shape.

In the present invention, the ferromagnetic metal powder can be effectively prevented from corrosion, so that the invention is advantageously applied to a magnetic recording medium particularly using a ferromagnetic metal powder. Even in the case of using a ferromagnetic metal powder having a specific surface area (S-BET) of not less than 45 m²/g, the ferromagnetic metal powder can be well dispersed, and hence it is advantageous to utilize the invention in the case of using such minimized ferromagnetic metal powder.

In the magnetic recording layer of the magnetic recording medium of the invention is contained a binder in an amount of 10–40 parts by weight, preferably 15–30 parts by weight, based on 100 parts by weight of the above-mentioned ferromagnetic powder.

The binder in the recording layer comprises a resin component comprising a vinyl chloride copolymer containing a repeating unit having an epoxy group and a repeating having a specific polar group and a polyurethane resin containing a repeating unit having a specific polar group.

The vinyl chloride copolymer contains a vinyl chloride repeating unit, a repeating unit having an epoxy group, and a repeating unit having a specific polar group.

The repeating unit having a polar group composing the vinyl chloride copolymer has at least one polar group selected from the group consisting of —SO₃M, —OSO₃M, —COOM and —PO(OM')₂, in which M and M' have the same meanings as defined hereinbefore. These polar groups may be contained in the vinyl chloride copolymer singly or in combination.

Preferred is a vinyl chloride copolymer containing a repeating unit having —SO₃Na as a polar group.

The above-mentioned repeating unit having a polar group is contained in the vinyl chloride copolymer in an amount of generally 0.01 to 5.0 mol%, preferably 0.5 to 3.0 mol%.

The repeating unit having an expoxy group is contained in the copolymer in an amount of generally 1.0 to 30 mol%, preferably 1 to 20 mol%. The vinyl chloride copolymer contains the repeating unit having an epoxy group in an amount of generally 0.01 to 0.5 mol, preferably 0.01 to 0.3 mol, per 1 mol of the vinyl chloride repeating unit.

When the amount of the repeating unit having an epoxy group is less than 1 mol%, or when the amount thereof per 1 mol of the vinyl chloride repeating unit is less than 0.01 mol, a hydrochloric acid gas is not effectively prevented from releasing from the vinyl chloride copolymer. When the amount thereof exceeds 30 mol%, or when the amount thereof per 1 mol of the vinyl chloride repeating unit exceeds 0.5 mol, the vinyl chloride copolymer is apt to be lowered in hardness, whereby the resulting magnetic recording layer is decreased in the running endurance.

When the amount of the repeating unit having the specific polar group is less than 0.01 mol%, the ferromagnetic powder is liable to be poorly dispersed. When the amount of the repeating unit exceeds 5.0 mol%, the vinyl chloride copolymer becomes hygroscopic, whereby the resulting medium is decreased in the weathering resistance.

The above-described vinyl chloride copolymer generally has a number-average molecular weight ranging from 15,000 to 60,000.

The vinyl chloride copolymer having the above-mentioned epoxy group and specific polar group can be prepared, for instance, by the following process.

In the case of preparing a vinyl chloride copolymer incorporated with an epoxy group and a polar group of $-SO_3Na$, sodium 2-(meth)acrylamido-2-methylpropanesufonate salt having a reactive double bond and $-SO_3Na$ as a polar group (monomer having a reactive double bond and a polar group) and diglycidyl acrylate are mixed at a low temperature, and the mixture is polymerized with vinyl chloride under a pressure at a temperature of not higher than 100° C.

As examples of the monomer having a reactive double bond and a polar group employable for introducing a polar group in the above method, there can be mentioned 2-(meth)acrylamide-2-methylpropanesulfonic acid, vinyl sulfonic acid, sodium salt or potassium salt thereof, (meth)acrylic acid-ethyl 2-sulfonate, sodium salt or potassium salt thereof, maleic anhydride, (meth)acrylic acid, and a (meth)acrylic acid-2-phosphoric acid ester, as well as the above-mentioned sodium 2-(meth)acrylamido-2-methylpropanesulfonate salt.

For introducing the epoxy group, glycidyl (meth)acrylate is generally employed as a monomer having a reactive double bond and an epoxy group.

A method for incorporating a polar group into a vinyl chloride copolymer employable in the invention is by no means restricted to the above-described one, and other methods can be also employed. For instance, vinyl chloride and vinyl alcohol are subjected to a polymerization reaction to produce a vinyl chloride copolymer having a polyfunctional base, $-OH$, and thus produced copolymer is caused to react with a compound containing the following polar groups and chlorine atom (i.e., dehydrochlorination reaction), to incorporate a polar group into the copolymer.

Examples of the polar groups employable in the above method are as follows:
$ClCH_2CH_2SO_3M$;
$ClCH_2CH_2OSO_3M$;
$ClCH_2COOM$; and
$ClCH_2PO(OM')_2$;
in which M and M' have the same meanings as defined hereinbefore.

For introducing an epoxy group by utilizing the dehydrochlorination reaction, epichlorohydrin is generally employed.

The vinyl chloride copolymer employable in the present invention may contain other monomers than the above-mentioned monomer. Examples of other monomers include vinyl ethers (e.g., methyl vinyl ether, isobutyl vinyl ether and lauryl vinyl ether), α-monoolefins (e.g., ethylene and propylene), acrylic acid esters (e.g., (meth)acrylic acid methyl and (meth)acrylic acid ester containing a functional group such as hydroxyethyl(meth)acrylate), unsaturated nitrile (e.g., (meth)acrylonitrile), aromatic vinyl (e.g., styrene and α-methyl styrene), and vinyl ester (e.g., vinyl acetate and vinyl propionate). In the case of using those monomers, the amount thereof contained in the vinyl chloride copolymer is generally not larger than 20 parts by weight.

The methods for incorporating a polar group into a vinyl chloride copolymer is described in Japanese Patent Provisional Publications No. 57(1982)-44227, No. 58(1983)-108032, No. 59(1984)-8127 and No. 60(1985)-101161, as described hereinbefore, and those methods can be also utilized in the present invention.

The repeating unit having a polar group composing a polyurethane resin employable for the invention has at least one group consisting of $-SO_3M$, $-OSO_3M$, $-COOM$ and $-PO(OM')_2$, in which M and M' have the same meanings as defined hereinbefore. These polar groups may be contained in the polyurethane resin singly or in combination.

Preferred is a polyurethane resin containing a repeating unit having a $-SO_3Na$ as a polar group.

The polyurethane resin having such repeating unit can be prepared, for instance, by the following process.

A polyurethane resin is generally produced by reaction of a polyisocyanate compound with a polyol component. As the polyol component, there is generally used polyester polyol which is produced by a reaction of polyol with a polybasic acid.

The above-described conventional process can be applied to the preparation of a polyurethane resin employable in the invention. In more detail, a polybasic acid having a specific polar group as a portion of the polybasic acid is used to prepare polyester polyol, and the obtained polyester polyol is caused to react with a polyisocyanate compound to prepare a polyurethane resin.

Examples of the polybasic acid having a polar group include 5-sulfoisophthalic acid, 2-sulfoisophthalic acid, 4-sulfophthalic acid, 3-sulfophthalic acid, dialkyl 5-sulfoisophthalate, dialkyl 2-sulfoisophthalate, alkyl 4-sulfophthalate, alkyl 3-sulfophthalate, sodium salts thereof, and potassium salts thereof.

The above-mentioned reaction is already known, and a polyurethane resin can be prepared by utilizing the known reaction.

Examples of the polyol component employable in the invention include trimethylolpropane, hexanetriol, glycerol, trimethylolethane, neopentyl glycol, pentaerythritol, ethylene glycol, propylene glycol, butylene glycol and diethylene glycol.

Examples of dicarboxylic acid among the polybasic acids include phthalic acid, isophthalic acid, terephthalic acid, adipic acid, dimerized linolenic acid, sebacic acid, and maleic acid.

The polyester polyol having a specific polar group obtained as above generally has a number-average molecular weight ranging from 500 to 8,000.

Examples of the polyisocyanate compound include a reaction product of 3 moles of diisocyanate (e.g., diphenylmethane-4,4'-diisocyanate, tolylene diisocyanate, or xylylene diisocyanate) and 1 mol of trimethylolpropane, a buret adduct compound of 3 moles of hexamethylene diisocyanate, an isocyanurate compound of 5 moles of tolylene diisocyanate, an isocyanurate adduct compound of 3 moles of tolylene diisocyanate and 2 moles of hexamethylene diisocyanate, and a polymer of diphenylmethane diisocyanate.

The reaction conditions are determined in such a manner that a number-average molecular weight of the polyurethane resin would be in the range of generally 10,000–200,000, preferably 15,000–60,000.

A method for incorporating a polar group into the polyurethane resin employable in the invention is by no means restricted to the above-described one, and other methods can be also employed. For instance, a polyurethane resin incorporated with a polyfunctional base, —OH, is first produced, and the polyurethane resin is caused to react with a compound containing the following polar groups and a chlorine atom (i.e., dehydrochlorination reaction), to incorporate a polar group into the polyurethane resin.

Examples of the polar groups employable in the above method are as follows:
$ClCH_2CH_2SO_3M$;
$ClCH_2CH_2OSO_3M$;
$ClCH_2COOM$; and
$ClCH_2PO(OM')_2$;
in which M and M' have the same meanings as defined hereinbefore.

The repeating unit having the polar group is contained in the polyurethane resin in an amount of generally 0.01–5 mol%, preferably 0.1–2.0 mol%.

The methods for incorporation of a polar group into a polyurethane resin is described in Japanese Patent Publications No. 54(1979)-157603 and No. 58(1983)-41565, and Japanese Patent Provisional Publications No. 57(1982)-92422 and No. 57(1982)-92423, as described hereinbefore, and those methods can be also utilized in the present invention.

A combination of the above-mentioned vinyl chloride copolymer and polyurethane resin are employed as a binder for a magnetic recording layer of the recording medium of the present invention. The ratio between the vinyl chloride copolymer and the polyurethane resin is generally in the range of from 85:15 to 10:90 (vinyl chloride copolymer:polyurethane resin), preferably in the range of from 70:30 to 30:70, by weight.

By employing the above-mentioned combination of a vinyl chloride copolymer having an epoxy group and a specific polar group and a polyurethane resin having a specific polar group, the polar groups in the copolymer and the resin serve to enhance the affinity for the employed ferromagnetic powder, and hence the ferromagnetic powder can be well dispersed in the resulting magnetic recording layer. Accordingly, a squareness ratio of the magnetic recording layer increases to show high reproduction output. Further, since agglomerates of the ferromagnetic powder are less produced in the recording layer, the ferromagnetic powder hardly drops off from the recording layer, so that occurrence of instantaneous clogging on a magnetic head can be prominently reduced.

As a binder, there can be employed the following resins in combination with the above-mentioned vinyl chloride copolymer and polyurethane resin. Examples of the resins employable in combination include vinyl chloride/vinyl acetate copolymers; copolymers of vinyl chloride/vinyl acetate, vinyl alcohol, maleic acid and/or acrylic acid; vinyldene chloride/vinyl chloride copolymers; vinyl chloride/acrylonitrile copolymers, ethylene/vinyl acetate copolymers; cellulose derivatives such as nitrocellulose resins; acrylic resins; polyvinyl acetal resin; polyvinyl butyral resin; epoxy resin; and phenoxy resin.

Those resins are employed in combination with the vinyl chloride copolymer and the polyurethane resin generally in an amount of not larger than 20 parts by weight per 100 parts by weight of the binder.

A polyisocyanate compound can be further added in the preparation of a magnetic recording layer of the recording medium of the invention. In this case, the same polyisocyanate compound as that used in the preparation of the polyurethane resin can be employed.

The magnetic recording layer of the recording medium of the present invention generally contains an abrasive. There is no specific limitation on the abrasive employable in the invention, and the abrasive can be selected from those generally employed. The amount of the abrasive is generally in the range of 0.2 to 10 parts by weight based on 100 parts by weight of the ferromagnetic powder.

The magnetic recording layer preferably contains other additives such as carbon black having a conductivity and a lubricant than the abrasive.

An example of processes for the preparation of a magnetic recording medium of the present invention is described below.

In the first place, the above-mentioned ferromagnetic powder and binder (and an abrasive or a filler, if necessary) are kneaded with a solvent to prepare a magnetic paint. The solvent used in the kneading procedure can be selected from those generally employed in the preparation of a magnetic paint. Kneading of those components can be carried out according to the conventional manner, and the order of addition of those components can be appropriately determined.

In the second place, the magnetic paint prepared as above is applied to the aforementioned nonmagnetic support. The magnetic paint can be coated directly on the nonmagnetic support, but it is possible to provide an adhesive layer to combine the magnetic paint layer with the nonmagnetic support.

The magnetic recording layer has a thickness (after dryness) generally of approx. 0.5 to 10 $\mu$m, preferably of approx. 1.5 to 7.0 $\mu$m.

The magnetic recording layer provided on the nonmagnetic support is generally subjected to a treatment of orienting the ferromagnetic powder contained in the magnetic recording layer, that is, a magnetic orientation, and then subjected to a drying process. The dried magnetic recording layer is generally heated to cure the resin component in the layer, and then, if necessary, subjected to a surface smoothening process. The magnetic recorcing medium having been subjected to these processes such as the smoothening process is subjected to a blading treatment as desired, and then cut to give a medium having a desired shape.

The examples and the comparison examples of the present invention are given below. In the following examples, the expression "part(s)" means "part(s) by weight", otherwise specified.

EXAMPLE 1

The components indicated below were kneaded in a ball mill for 48 hours to give a homogeneous dispersion.

| | |
|---|---|
| Ferromagnetic metal alloy powder (Fe—Zn—Ni alloy, Fe: 92 wt. %, Zn: 4 wt. %, Ni: 4 wt. %, specific surface area: 52.5 m$^2$/g, Hc: 1,530 Oe, saturation magnetic moment: 120 emu/g) | 100 parts |

-continued

| | |
|---|---|
| Vinyl chloride copolymer | 12 parts |
| Polyurethane resin | 5 parts |
| α-Al$_2$O$_3$ (mean particle size: 0.3 μm) | 5 parts |
| Stearic acid | 2 parts |
| Butyl stearate | 2 parts |
| Methyl ethyl ketone | 300 parts |
| Methyl isobutyl ketone | 50 parts |

The vinyl chloride copolymer and polyurethane resin were prepared by the following processes.

Vinyl chloride copolymer

Into a 500-ml stainless autoclave equipped with a magnetic induction stirrer and a pressure indicator were introduced 300 ml of nitrogen-substituted distilled water dissolving 0.6 g. of polyvinyl alcohol, 0.15 g. of azobisisobutyronitrile, 16.6 g. of glycidyl methacrylate and 8.0 g. of sodium 2-acrylamido-2-methylpropanesulfonate, and the autoclave is covered with a lid. The autoclave is then allowed to cool in a dry ice-methanol bath to lower a temperature within the autoclave to −20° C.

Subsequently, the autoclave was charged with nitrogen gas to substitute a gas in the autoclave by the nitrogen gas, and then rapidly introduced 100 g. of a cooled liquid vinyl chloride. The components in the autoclave were stirred for approx. 15 min. at elevating temperature inside the autoclave to 60° C. to perform a polymerization reaction.

All of the reactive components in the autoclave were consumed to lower the pressure inside the autoclave so as to complete the polymerization reaction.

After lowering of the pressure, the autoclave was cooled to room temperature, and nitrogen was introduced into the autoclave to remove the remaining vinyl chloride. The obtained product was taken out of the autoclave. The product was then sufficiently washed with water and filtered to obtain a white powder of the polymerization product. The polymerization product was then dried under vacuum at 40° C. for 12 hours.

As a result of elemental analysis, thus obtained product was confirmed to be a vinyl chloride copolymer in which vinyl chloride, sodium 2-acrylamido-2-methylpropanesulfonate and glycidyl methacrylate were polymerized in a molar ratio of 87.5:2.5:10 (vinyl chloride:- sodium 2-acrylamido-2-methylpropanesulfonate:glycidyl methacrylate).

The obtained vinyl chloride copolymer was measured on an intrinsic viscosity [η] by the use of methyl ethyl ketone. The intrinsic viscosity thereof was 0.21.

Polyurethane resin

Into a reactor equipped with a thermometer, a stirrer and a partial reflux condenser were introduced 582 g. of dimethyl terephthalate, 157 g. of dimethyl 5-sodium sulfoisophthalate, 434 g. of ethylene glycol, 728 g. of neopentyl glycol, 0.66 g. of zinc acetate and 0.08 g. of sodium acetate, to perform a reaction at 220° C. for 2 hours. To the reaction product in the reactor was further added 1,212 g. of sebacic acid to carry out a reaction for 2 hours. Then the pressure of the reaction system was reduced to 20 mmHg for 30 min., and the polymerization reaction was carried out at a pressure of 5-20 mmHg and a temperature of 250° C. for 50 min. to produce polyester polyol.

In the obtained polyester polyol, terephthalic acid, dimethyl 5-sodium sulfoisophthalic acid, sebacic acid, ethylene glycol and neopentyl glycol bonded to each other in a molar ratio of 15.3:2.9:30.7:22.5:28.6 (terephthalic acid:dimethyl 5-sodium sulfoisophthalic acid:- sebacic acid:ethylene glycol:neopentyl glycol).

Into the same reactor as described above were introduced 1,000 g. of the polyester polyol obtained above, 1,280 g. of toluene, 850 g. of methyl isobutyl ketone, 71 g. of diphenylmethane diisocyanate and 1.2 g. of dibutyl tin dilaurate, to perform a reaction at a temperature of 70°-90° C. for 8 hours so as to produce a polyurethane resin. In the obtained polyurethane resin, dimethyl 5-sodiumsulfoisophthalate was polymerized in an amount of 0.25 mol%.

The aforementioned dispersion was filtered over a filter having mean pore size of 1 μm to give a magnetic paint. The magnetic paint was coated over a polyethylene terephthalate support (thickness: 10 μm) to give a coated layer of a thickness of 3.0 μm (thickness in dry state) by means of a reverse roll. The nonmagnetic support with the coated layer was treated with an electromagnet at 3,000 gauss under wet condition to bive a magnetic orientation. After the coated layer was dried, the dried layer was subjected to supercalendering, heat treatment and blading treatment. The resulting sheet was slit into a width of 8 mm to prepare an 8 mm type video tape.

The obtained video tape was evaluated on a glossiness of the surface thereof, a squareness ratio, a reproduction output and a weathering resistance according to the following tests. The results are set forth in Table 1.

(1) Surface glossiness

The measurement of the glossiness was done based on JIS-Z-8741 at an angle of incidence of 45°. The values set forth in Table 1 were relative values in the case of a specular glossiness of a glass surface at a refractive index of 1.567 being 100%.

(2) Squareness ratio

The measurement of the squareness ratio was done by measuring Br/Bm at Hm at 5 kOe by means of a vibrating sample magnetic flux measuring machine (produced by Toei Industries Co., Lid.).

(3) Reproduction output

A relative reproduction output was measured in the case that a reproduction output of a reference tape (a tape prepared in Comparison Example 1) recorded with a signal at 4 MHz was set to 0 dB.

(4) Weathering resistance

The obtained video tape was allowed to stand for one week in contact with a permalloy head in atmosphere of 60° C. and 85%RH, and the the surface of the permalloy head was observed on tendency of corrosion by means of a microscope. The results of the evaluation are classified into the following.

A: no corrosion is found;
B: some corrosion is found; and
C: corrosion is found almost all over the surface.

EXAMPLE 2

The procedure of Example 1 was repeated except for using 8.3 g. of glycidyl methacrylate and 8.5 g. of vinyl acetate instead of 16.6 g. of glycidyl methacrylate, to prepare a vinyl chloride copolymer. In the obtained vinyl chloride copolymer, the copolymerization ratio among vinyl chloride, sodium 2-acrylamido-2-methylpropanesulfonate, glycidyl methacrylate and vinyl acetate was 80:2.5:5:5 (vinyl chloride:sodium 2-acrylamido- 2-methylpropanesulfonate:glycidyl methacrylate:vinyl acetate), by mol.

Using the vinyl chloride copolymer, a magnetic recording medium (video tape) was prepared in the same manner as described in Example 1.

The obtained video tape was evaluated on a glossiness of the surface thereof, a squareness ratio, a reproduction output and a weathering resistance according to the above-described tests. The results are set forth in Table 1.

EXAMPLE 3

The procedure of Example 1 was repeated except for using 3.3 g. of glycidyl methacrylate and 13.6 g. of vinyl acetate instead of 16.6 g. of glycidyl methacrylate, to prepare a vinyl chloride copolymer. In the obtained vinyl chloride copolymer, the copolymerization ratio among vinyl chloride, sodium 2-acrylamido-2-methylpropanesulfonate, glycidyl methacrylate and vinyl acetate was 80:2.5:2:8 (vinyl chloride:sodium 2-acrylamido-2-methylpropanesulfonate:glycidyl methacrylate:vinyl acetate), by mol.

Using the vinyl chloride copolymer, a magnetic recording medium (video tape) was prepared in the same manner as described in Example 1.

The obtained video tape was evaluated on a glossiness of the surface thereof, a squareness ratio, a reproduction output and a weathering resistance according to the above-described tests. The results are set forth in Table 1.

EXAMPLE 4

The procedure of Example 1 was repeated except for using 3.5 g. of maleic anhydride instead of 8.0 g. of sodium 2-acrylamido-2-methylpropanesulfonate to prepare a vinyl chloride copolymer.

As a result of elemental analysis on the obtained copolymer, the copolymerization ratio among vinyl chloride, maleic anhydride and glycidyl methacrylate was 87.5:2.5:10 (vinyl chloride:maleic anhydride:glycidyl methacrylate), by mol.

Using the vinyl chloride copolymer, a magnetic recording medium (video tape) was prepared in the same manner as described in Example 1.

The obtained video tape was evaluated on a glossiness of the surface thereof, a squareness ratio, a reproduction output and a weathering resistance according to the above-described tests. The results are set forth in Table 1.

EXAMPLE 5

The procedure of Example 1 was repeated except for using 50 g. of mellitic anhydride instead of 157 g. of dimethyl 5-sodiumsulfoisophthalate to prepare a polyurethane resin.

Using the polyurethane resin, a magnetic recording medium (video tape) was prepared in the same manner as described in Example 1.

The obtained video tape was evaluated on a glossiness of the surface thereof, a squareness ratio, a reproduction output and a weathering resistance according to the above-described tests. The results are set forth in Table 1.

COMPARISON EXAMPLE 1

The procedure of Example 1 was repeated except for using 17 g. of vinyl acetate instead of 16.6 g. of glycidyl methacrylate to prepare a vinyl chloride copolymer.

Using the vinyl chloride copolymer, a magnetic recording medium (video tape) was prepared in the same manner as described in Example 1.

The obtained video tape was evaluated on a glossiness of the surface thereof, a squareness ratio, a reproduction output and a weathering resistance according to the above-described tests. The results are set forth in Table 1.

COMPARISON EXAMPLE 2

The procedure of Example 1 was repeated except for not using dimethyl 5-sodiumsulfoisophthalate to prepare a polyurethane resin.

Using the polyurethane resin, a magnetic recording medium (video tape) was prepared in the same manner as described in Example 1.

The obtained video tape was evaluated on a glossiness of the surface thereof, a squareness ratio, a reproduction output and a weathering resistance according to the above-described tests. The results are set forth in Table 1.

TABLE 1

|  | Glossiness (%) | Squareness Ratio | Reproduction Output (dB) | Weathering Resistance |
|---|---|---|---|---|
| Example 1 | 105 | 0.85 | 0.1 | A |
| Example 2 | 102 | 0.84 | 0.2 | A |
| Example 3 | 99 | 0.84 | 0.0 | B |
| Example 4 | 97 | 0.83 | −0.1 | A |
| Example 5 | 98 | 0.82 | −0.2 | A |
| Com. Example 1 | 100 | 0.84 | 0.0 | C |
| Com. Example 2 | 85 | 0.81 | −0.5 | A |

We claim:

1. A magnetic recording medium comprising a non-magnetic support and a magnetic recording layer provided on the support, said magnetic recording layer comprising a binder and a ferromagnetic powder dispersed therein, which is characterized in that said binder is composed of a resin component comprising:
   a vinyl chloride copolymer containing a repeating unit having at least one polar group selected from the group consisting of —SO$_3$M, —OSO$_3$M, and —PO(OM')$_2$, wherein M is hydrogen or an alkali metal atom, and M' is hydrogen, an alkali metal atom or a lower hydrocarbon group, and a repeating unit having a epoxy group in an amount of from 1 to 30 mol%; and
   a polyurethane resin containing a repeating unit having at least one polar group selected from the group consisting of —SO$_3$M, —OSO$_3$M, and —PO(OM')$_2$, wherein M and M' have the same meanings as defined above;
   the ratio between the vinyl chloride copolymer and the polyurethane resin being in the range of from 85:15 to 10:90 by weight.

2. The magnetic recording medium as claimed in claim 1, wherein the ratio between the vinyl chloride copolymer and the polyurethane resin in said binder is in the range of from 70:30 to 30:70, by weight.

3. The magnetic recording medium as claimed in claim 1, wherein said vinyl chloride copolymer contains the repeating unit having an epoxy group in an amount of 0.01–0.5 mol based on 1 mol of the vinyl chloride repeating unit thereof.

4. The magnetic recording medium as claimed in claim 1, wherein said ferromagnetic powder is a ferromagnetic metal powder having a specific surface area of not less than 45 m$^2$/g.

5. The magnetic recording medium as claimed in claim 1, wherein said vinyl chloride copolymer contains the repeating unit having a polar group in an amount of 0.01–5.0 mol%.

6. The magnetic recording medium as claimed in claim 1, wherein said polyurethane resin contains the repeating unit having a polar group in an amount of 0.01–5.0 mol%.

7. The magnetic recording medium as claimed in claim 1, wherein at least one of said repeating unit of said vinyl chloride copolymer and said repeating unit of said polyurethane resin has —SO$_3$Na as a polar group.

8. The magnetic recording medium as claimed in claim 1, wherein said repeating unit of said vinyl chloride copolymer has —SO$_3$Na as a polar group and said repeating unit of said polyurethane resin has —SO$_{13}$Na as a polar group.

* * * * *